(12) United States Patent
Listing et al.

(10) Patent No.: US 10,910,775 B2
(45) Date of Patent: Feb. 2, 2021

(54) DRIVE ELEMENT WITH AN OVERLOAD COUPLER FOR AN ELECTRICAL CONNECTOR WITH A DRIVE AND ALSO AN ELECTRICAL CONNECTOR WITH SUCH A DRIVE ELEMENT

(71) Applicant: TE Connectivity Germany GmbH, Bensheim (DE)

(72) Inventors: Martin Listing, Langen (DE); Dominik Heiss, Dielheim (DE); Ralf Schwan, Einhausen (DE); Thomas Mueller, Langen (DE); Michael Schecker, Griesheim (DE)

(73) Assignee: TE Connectivity Germany GmbH, Bensheim (DE)

( * ) Notice: Subject to any disclaimer, the term of this patent is extended or adjusted under 35 U.S.C. 154(b) by 0 days.

(21) Appl. No.: 16/403,707

(22) Filed: May 6, 2019

(65) Prior Publication Data

US 2019/0341726 A1 Nov. 7, 2019

(30) Foreign Application Priority Data

May 7, 2018 (DE) .......................... 10 2018 207 087

(51) Int. Cl.
 *H01R 13/66* (2006.01)
 *H01R 13/639* (2006.01)
 *H02K 7/116* (2006.01)

(52) U.S. Cl.
 CPC ....... *H01R 13/6608* (2013.01); *H01R 13/639* (2013.01); *H02K 7/116* (2013.01); *H01R 2201/26* (2013.01)

(58) Field of Classification Search
 CPC .............. H01R 13/6608; H01R 13/639; H01R 2201/26; H02K 7/116
 See application file for complete search history.

(56) References Cited

U.S. PATENT DOCUMENTS

| 4,702,122 A * | 10/1987 | Richard ................. F16D 7/021 192/56.1 |
| 2013/0284477 A1 | 10/2013 | Braun |
| 2014/0169865 A1 | 6/2014 | Kurumizawa et al. |
| 2019/0341726 A1* | 11/2019 | Listing .................... F16H 35/10 |

FOREIGN PATENT DOCUMENTS

| DE | 102009046477 A1 | 5/2011 |
| DE | 102016445683 A1 | 3/2018 |
| EP | 2632644 B1 | 9/2011 |

OTHER PUBLICATIONS

German Office Action, dated Nov. 30, 2020, 6 pages.
Abstract of DE 102009046477, dated May 26, 2011, 2 pages.
Abstract of DE 102016115683, dated Mar. 1, 2018, 1 page.

* cited by examiner

*Primary Examiner* — Abdullah A Riyami
*Assistant Examiner* — Nader J Alhawamdeh
(74) *Attorney, Agent, or Firm* — Barley Snyder

(57) ABSTRACT

A drive element for an electrical connector comprises a gear wheel and an overload coupler. The overload coupler is between the gear wheel and a hub.

18 Claims, 3 Drawing Sheets

DRIVE ELEMENT WITH AN OVERLOAD COUPLER FOR AN ELECTRICAL CONNECTOR WITH A DRIVE AND ALSO AN ELECTRICAL CONNECTOR WITH SUCH A DRIVE ELEMENT

CROSS-REFERENCE TO RELATED APPLICATION

This application claims the benefit of the filing date under 35 U.S.C. § 119(a)-(d) of German Patent Application No. 102018207087.3, filed on May 7, 2018.

FIELD OF THE INVENTION

The present invention relates to a drive element and, more particularly, to a drive element for an electrical connector.

BACKGROUND

A drive element of an electrical connector is used, for example, in charging connectors, such as charging sockets for electric vehicles. To charge the electric vehicle, the charging connectors are locked by way of a displaceable bolt. To displace the bolt, a drive is provided, for example, in the form of an electric motor. The drive element is situated between the drive and the bolt. The drive element is often a sprocket as part of a gear unit. The drive element and the electrical connector incorporating the drive element, however, often have a short service life.

SUMMARY

A drive element for an electrical connector comprises a gear wheel and an overload coupler. The overload coupler is between the gear wheel and a hub.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
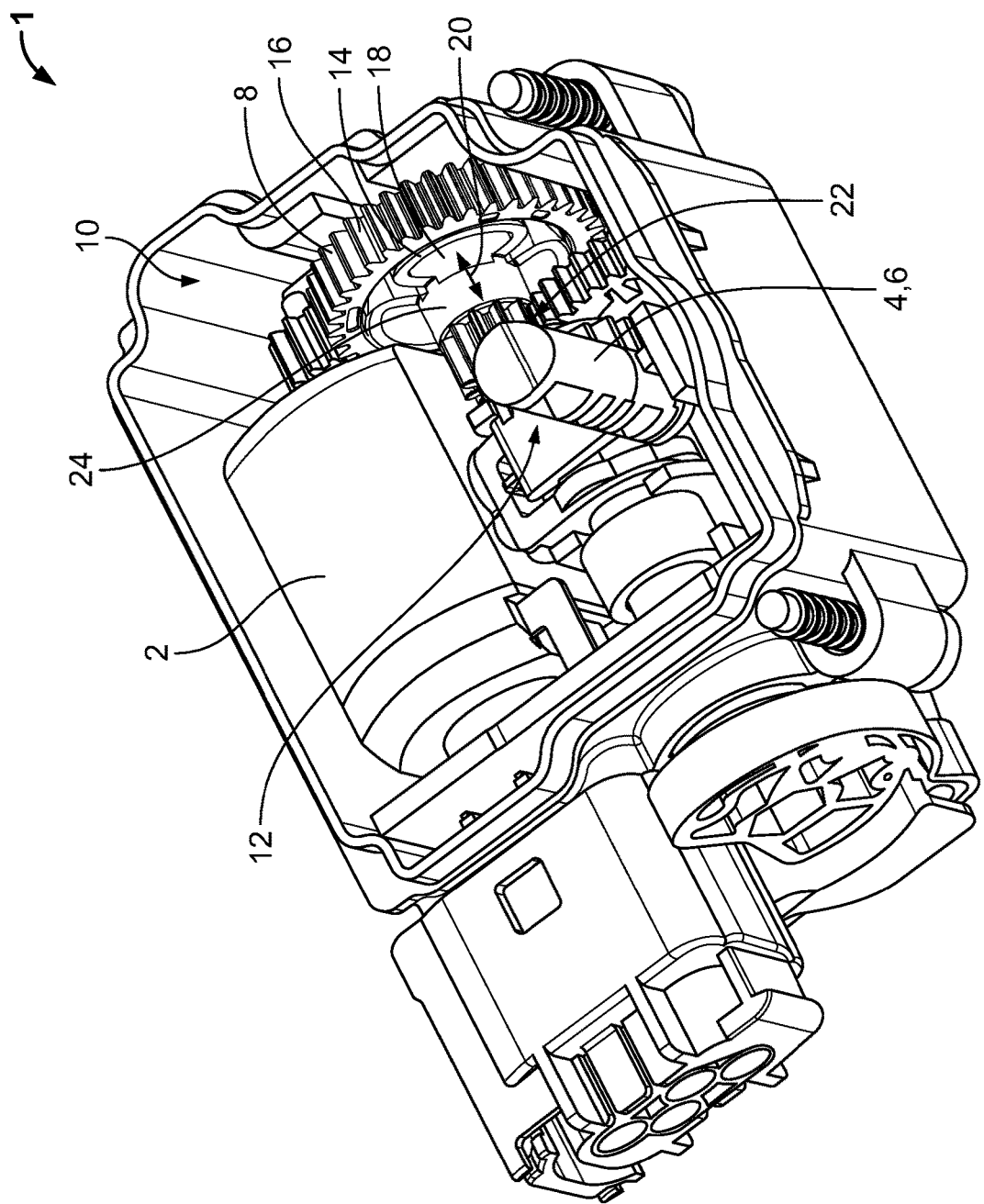
FIG. 1 is a perspective view of an electrical connector according to an embodiment.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiment set forth herein; rather, these embodiments are provided so that the present disclosure will convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

An electrical connector 1 according to an embodiment is shown in FIG. 1. The electrical connector 1 is used, for example, as a charging socket for an electric vehicle. The electrical connector 1 has a drive 2 and a driven element 4. In an embodiment, the drive 2 is an electric motor and the driven element 4 is a locking bolt 6. Situated between the drive 2 and the driven element 4, there is a drive element 8. In the shown embodiment, the drive element 8 is a sprocket and can be part of a gear unit 10. The electrical connector 1, in the shown embodiment, has at least one mechanical stop 12, against which the driven element 4 is moved in a fully extended position shown in FIG. 1 or a fully retracted position.

The drive element 8, as shown in FIG. 1, has an overload coupler 14 between a gear wheel 16 and a hub 18. The overload coupler 14 protrudes in an axial direction 20 not beyond the gear wheel 16. In the shown embodiment, the gear wheel 16 is externally toothed. The overload coupler 14 limits a maximum torque transmitted between the hub 18 and the gear wheel 16 to a predetermined torque. In an embodiment, the overload coupler 14 is a sliding coupler, which slips through from a predetermined slip moment. If the slip moment is not yet reached, the hub 18 and the gear wheel 16 are connected to one another in a rotationally fixed manner. When the slip moment is exceeded, the hub 18 and the gear wheel 16 rotate relative to one another, the overload coupler 14 slips through and the overload coupler 14 transmits only a reduced residual moment. The overload coupler 14 thus acts as a torque limiter.

The drive element 8, as shown in FIG. 1, has a pinion 22. In the shown embodiment, the pinion 22 is aligned coaxially to the gear wheel 16 and is offset in the axial direction 20 relative to the gear wheel 16. A shaft section 24, which is untoothed in an embodiment, is situated between the hub 18 and the pinion 22. In the shown embodiment, the pinion 22 is monolithically formed with the drive element 8. In another embodiment, the shaft section 24 can be absent and the pinion 22 can adjoin the gear wheel 16 directly in the axial direction 20. The pinion 22 has a smaller number of teeth or a smaller diameter than the gear wheel 16.

Figure 2:
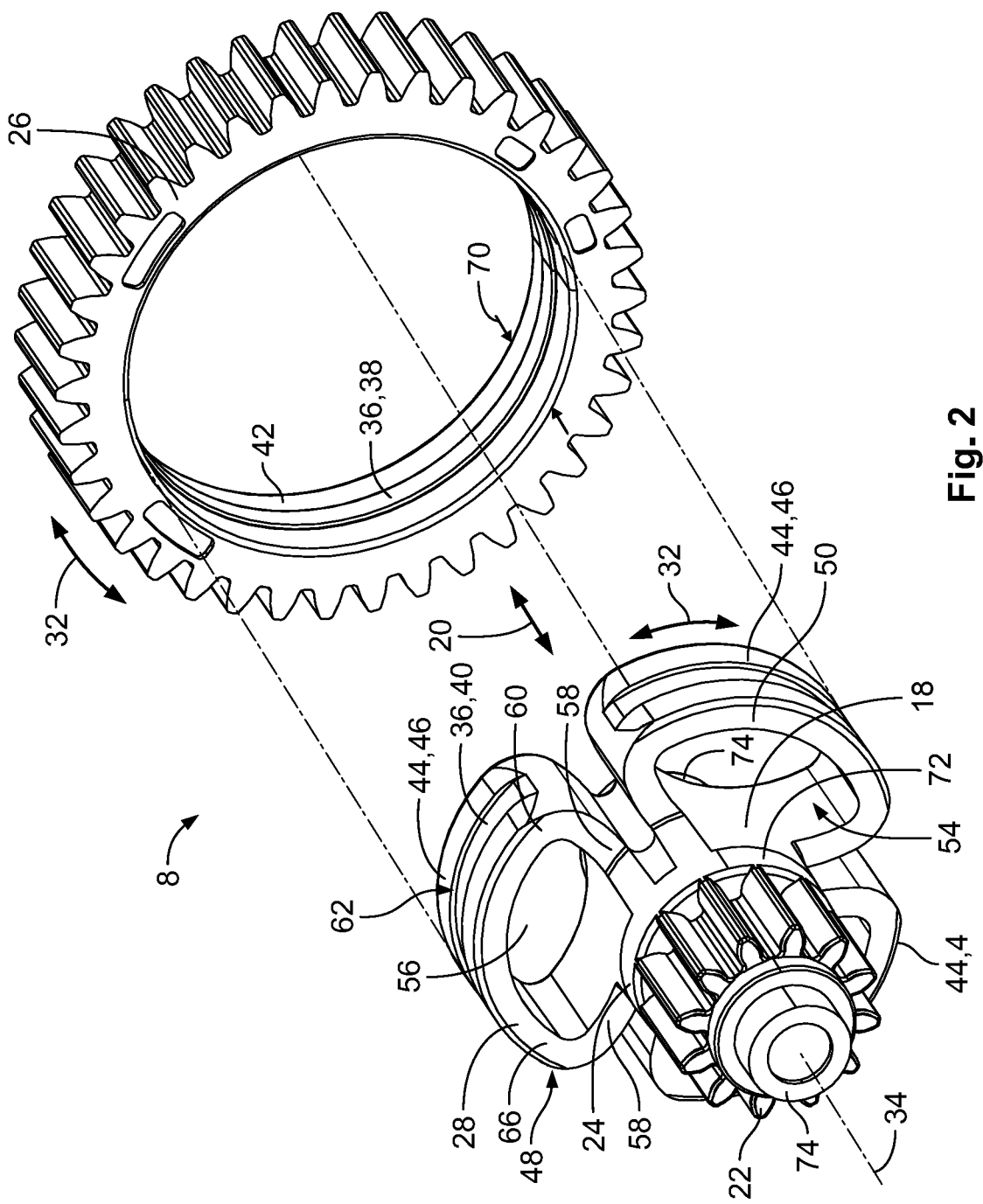
FIG. 2 is an exploded perspective view of a drive element of the electrical connector.
Figure 3:
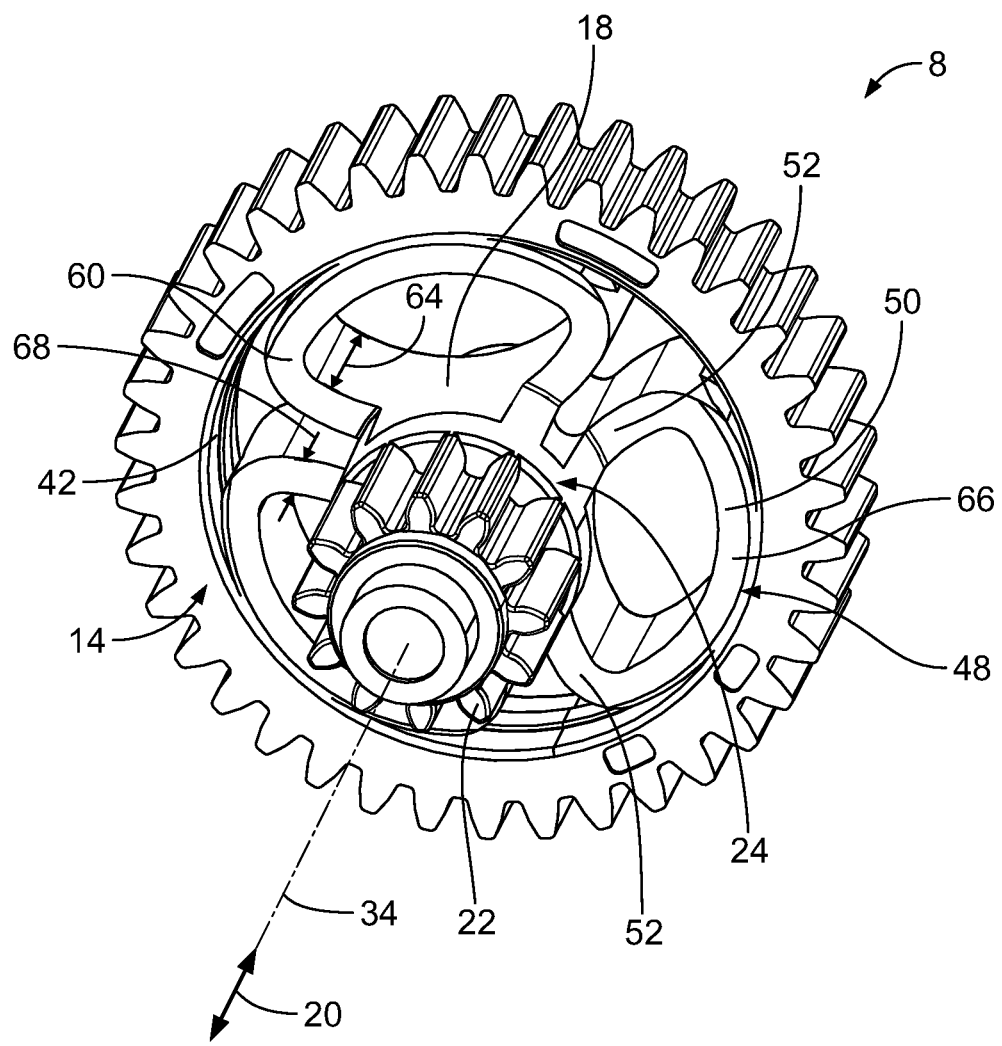
FIG. 3 is a perspective view of the drive element in an assembled state.

The drive element 8 is shown in greater detail in FIGS. 2 and 3. The drive element 8 has two parts: a gear-wheel part 26 forming the gear wheel 16 and a hub part 28 that forms the hub 18 of the drive element 8. In an embodiment, the gear-wheel part 26 and the hub part 28 are injection-molded from a plastic material. The gear-wheel part 26 and the hub part 28 together form the overload coupler 14.

As shown in FIGS. 2 and 3, to assemble the drive element 8, the hub part 28 is inserted into the gear-wheel part 26 in the axial direction 20. The hub part 28 is held captively in the gear-wheel part 26 in the axial direction 20 by way of an axially blocking form-fitting connection. In the circumferential direction 32 around the axial direction 20 or a rotation axis 34 of the drive element 8, the hub part 28 is held only in a frictionally locking manner in the gear-wheel part 26.

A friction-based overload coupler 14 arises from the frictionally locking hold. In order to simplify the assembly of the hub part 28 with the gear-wheel part 26, the hub part 28 is latched in the gear-wheel part 26 in the axial direction 20 or is clipped into the gear-wheel part 26. In order to assemble the drive element 8, the hub part 28 is pressed in the axial direction 20 into the gear wheel 16.

A plurality of form-fitting elements 36, shown in FIG. 2, which effect an axial securing of the hub part 28 in the gear-wheel part 26, include at least one radially projecting rib 38 concentric to the gear wheel 16 and extending in the circumferential direction 32, and at least one groove-shaped recess 40 configured complementary to the rib 38 and continuous in the circumferential direction 32. In an embodiment, the recess 40 is concentric to the hub 18. In an assembled state, the rib 38 is received in the recess 40. The form-fitting elements 36 serve not only for the axial securing but also for guiding in the circumferential direction 32, in order to define the plane in which a relative rotation between the gear-wheel part 26 and the hub part 28 is possible when the coupler 14 slips through.

In another embodiment, instead of the single continuous rib 38 shown in FIG. 2, several ribs 38 spaced apart from one another in the circumferential direction 32 can, of course, also be provided. Moreover, instead of a single rib 38, a fluting running in the circumferential direction 32 or a plurality of projections aligned in a ring shape and arranged next to one another in the axial direction 20, can, for example, be present both at the hub part 28 and at the gear-wheel part 26 in other embodiments; the flutings of the hub part 28 and the gear-wheel part 26 being splined with one another in the axial direction 20 in such a configuration.

In the embodiment shown in FIG. 2, the rib 38 is molded on the gear-wheel part 26. In another embodiment, the rib 38 can be disposed on the hub part 28, such that the recess 40 is then situated correspondingly on the gear-wheel part 26.

The overload coupler 14 has a friction surface 42 at the gear-wheel part 26 and a friction surface 44 at the hub part 28, as shown in FIG. 2. One of the two friction surfaces 42, 44, here the friction surface 44 at the hub part 28, does not have to be continuous in the circumferential direction 32, but rather can be divided into several partial surfaces 46 spaced apart from one another in the circumferential direction.

When the drive element 8 is put together, the friction surfaces 42, 44 are pressed against one another in order to permit the transmission of a drive moment from the drive 2 to the driven element 4. In order to produce the frictional connection, the overload coupler 14 has at least one radially elastic spring element 48, which is elastically deformed in a radial direction when the hub part 28 is inserted into the gear-wheel part 26 and which presses one friction surface against the other friction surface in order to produce a frictional connection between the hub part 28 and the gear-wheel part 26. In the shown embodiment, the overload coupler 14 has a plurality of radially elastic spring elements 48 evenly spaced apart from one another in the circumferential direction 32, which press against the radially opposite friction surface 42.

In the embodiment shown in FIG. 2, the spring elements 48 are molded on the hub part 28. In another embodiment, the spring elements 48 can be molded on the gear-wheel part 26; in this case, the annular friction surface 42 would be situated not on the gear-wheel part 26 as in FIG. 2, but on the hub part 28. In such an embodiment, the annular friction surface 42 could be formed directly by the hub 18, which is then clipped in the gear-wheel part 26. In the embodiment shown in FIG. 2, three spring elements 48 which follow one another in the circumferential direction 32 are shown in FIG. 2. In other embodiments, there may be between two and six spring elements 48.

Each spring element 48, as shown in FIGS. 2 and 3, has a leaf-spring-like, arcuate section 50 extending in a curved manner in the circumferential direction 32. The section 50 nestles against the opposite friction surface 42 at least in the region of the friction surface 44, in order to create as large a bearing surface as possible. If the spring element 48 is situated radially inside the opposite friction surface 42, the section 50 has a heavier curvature than the friction surface 42 lying opposite it.

The arcuate section 50, as shown in FIGS. 2 and 3, can be connected to the hub 18 via at least one spoke 52—or to the gear-wheel part 26 in the case of the spring element 48 arranged on the gear-wheel part 26. If there are two spokes 52 in the case of a spring element 48, a spring element 48 can form a loop 54 projecting in the radial direction. The loop 54 can be configured in a lenticular or elliptical manner, but also a circular manner, in an axial view. Together with the hub 18, the loop 54 forms a passage 56 which is closed in the radial direction and open axially.

The spring element 48, as shown in FIG. 2, has at least one base point 58 at which it is connected to the gear-wheel part 26 or to the hub part 28, depending on whether the loop 54 is formed by the gear-wheel part 26 or the hub part 28. If the spring element 48 forms a loop 54 together with the hub 18, the spring element 48 has two base points 58. The two base points 58 of a loop 54 are, in this case, spaced further apart from one another in the circumferential direction 32 than the two adjacent base points 58 of two spring elements 48 or loops 54 which follow one another in the circumferential direction 32.

At least one bent or heavily curved region 60, shown in FIGS. 2 and 3, can be situated in the region between the base point 58 of a spring element 48 and the section of the spring element 48 bearing against the opposite friction surface 42.

As shown in FIGS. 2 and 3, the curved section 50, the at least one spoke 52 and/or the loop 54 can be formed by a band-shaped section 62 of the hub part 28 or gear-wheel part 26. In this case, a depth 64 of the band 66 forming the band-shaped section 62 is larger, for example more than two or three times larger, than a material thickness 68 of the band 66 perpendicular to the depth 64. The radially resilient band 66 extends initially away from a base point 58 in the radial direction, it being also possible for there to be a component in the circumferential direction 32. This region forms a spoke 52. It can be curved back in the radial direction at its other end. The other end can be a free end or, as depicted, can end in a further base point 58.

For injection molding, at the hub part 28, a part of the contour of the passage 56 can extend out in the axial direction 20 over the axial depth 70 of the gearwheel 26, which corresponds to the depth 64 of the band 66, and can end in a shoulder 72 which is situated between the hub 18 and the pinion 22. The continuously circumferential shoulder 72 can represent a partition plane of the injection-molding tool.

The hub part 28 has another two axially projecting axle journals 74, as shown in FIG. 2, in order to be able to position the drive element 8 rotatably in the electrical connector 1.

In the electrical connector 1 according to the present invention, as a result of the overload coupler 14, the effects of acceleration and braking on the service life of the drive element 8 are mitigated; a failure of the drive element 8 or of the entire electrical connector 1 due to a broken tooth can be prevented. Further, because the overload coupler 14 does not project axially beyond the gear wheel 16, the drive element 8 with overload coupler 14 takes up the same installation space as a conventional drive element without overload coupler.

What is claimed is:

1. A drive element for an electrical connector, comprising:
a gear wheel; and an overload coupler between the gear wheel and a hub, the gear wheel is part of a gear-wheel part into which a hub part is inserted, the overload coupler has a plurality of radially elastic spring elements on the hub part spaced apart from one another in a circumferential direction, the overload coupler has a radially projecting rib projecting from the gear-wheel part and extending in the circumferential direction and a recess on at least one of the radially elastic spring elements complementary to and receiving the radially projecting rib.

2. The drive element of claim 1, wherein the overload coupler projects in an axial direction and does not project beyond the gear wheel in the axial direction.

3. The drive element of claim 1, wherein the hub part is held in a frictionally locking manner in the gear-wheel part in the circumferential direction.

4. The drive element of claim 3, wherein the gear-wheel part or the hub part has a radially inwardly directed friction surface that is part of the overload coupler.

5. The drive element of claim 3, wherein the hub part is held in a form-fitting manner in the gear-wheel part in an axial direction.

6. The drive element of claim 5, wherein the hub part is axially latched in the gear-wheel part.

7. The drive element of claim 1, wherein the radially projecting rib is received displaceably in the circumferential direction and fixed in an axial direction in the recess.

8. The drive element of claim 1, wherein the radially elastic spring elements press against a radially opposite friction surface.

9. The drive element of claim 8, wherein at least one of the radially elastic spring elements has a section extending a curved manner in the circumferential direction and bearing against the radially opposite friction surface.

10. The drive element of claim 9, wherein the section is formed by a leaf-spring-shaped band disposed between a pair of base points, the leaf-spring-shaped band is pressed against the radially opposite friction surface.

11. The drive element of claim 8, wherein at least one of the radially elastic spring elements extends radially away from a base point at the gear wheel or the hub.

12. The drive element of claim 11, wherein a bent or heavily curved region is disposed between the base point and a section of the at least one radially elastic spring element bearing against the radially opposite friction surface.

13. The drive element of claim 1, wherein at least one of the radially elastic spring elements forms a loop.

14. The drive element of claim 13, wherein the loop has a lenticular, elliptical, or circular shape in an axial view.

15. The drive element of claim 1, wherein the gear wheel and the overload coupler are injection molded.

16. An electrical connector, comprising:
a driven element;
a drive adapted to drive the driven element; and
a drive element between the drive and the driven element, the drive element having a gear wheel and an overload coupler between the gear wheel and a hub, the gear wheel is part of a gear-wheel part into which a hub part is inserted, the overload coupler has a plurality of radially elastic spring elements on the hub part spaced apart from one another in a circumferential direction, the overload coupler has a radially projecting rib projecting from the gear-wheel part and extending in the circumferential direction and a recess on at least one of the radially elastic spring elements complementary to and receiving the radially projecting rib.

17. A drive element for an electrical connector, comprising:
a gear wheel; and
an overload coupler between the gear wheel and a hub, the overload coupler has a plurality of radially elastic spring elements spaced apart from one another in a circumferential direction, the radially elastic spring elements press against a radially opposite friction surface, at least one of the radially elastic spring elements has a section extending in a curved manner in the circumferential direction and bearing against the radially opposite friction surface, the section is formed by a leaf-spring-shaped band disposed between a pair of base points, the leaf-spring-shaped band is pressed against the radially opposite friction surface.

18. A drive element for an electrical connector, comprising:
a gear wheel; and
an overload coupler between the gear wheel and a hub, the overload coupler has a plurality of radially elastic spring elements spaced apart from one another in a circumferential direction, the radially elastic spring elements press against a radially opposite friction surface, at least one of the radially elastic spring elements has a section extending in a curved manner in the circumferential direction and bearing against the radially opposite friction surface, the section is formed by a leaf-spring-shaped band located on at least one base point, the leaf-spring-shaped band is pressed against the radially opposite friction surface.

* * * * *